Patented Sept. 16, 1947

2,427,337

UNITED STATES PATENT OFFICE 2,427,337

VINYLFLUORENES AND METHOD OF PREPARING THE SAME

Royal K. Abbott, Jr., and Edward A. Kern, Pittsfield, Mass., assignors to General Electric Company, a corporation of New York No Drawing. Application August 28, 1945,
Serial No. 613,208

6 Claims. (Cl. 260—669)

1

The present invention relates to vinylfluorenes, more particularly to a monovinylfluorene, e. g., 2-vinylfluorene, and to a method of preparing the same.

The preparation of vinyl-substituted aromatic compounds of high molecular weight presents many difficulties because of the high boiling points of such compounds even under greatly reduced pressure, and because of the high melting points of the intermediates involved. In general, the methods which are applicable to the production of vinyl compounds of low molecular weight are not suitable for the synthesis of vinyl-substituted aromatic compounds of high molecular weight.

We have discovered that a monovinylfluorene, more particularly 2-vinylfluorene, which may be represented by the formula

I

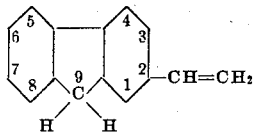

can be prepared by dehydrating a monofluorenyl-methylcarbinol, specifically 2-fluorenyl-methylcarbinol, which may be represented by the formula

II

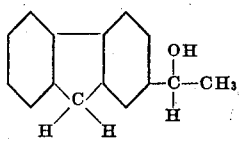

The latter compound, like 2-vinylfluorene, also is believed to be a new chemical compound. It is prepared, for example, by hydrogenating 2-acetylfluorene under controlled reaction conditions.

Briefly, then, it may be stated that the present invention involves the preparation of a monovinylfluorene, specifically 2-vinylfluorene, by acetylating fluorene with an acetylating agent, e. g., acetic acid or anhydride, acetyl chloride or bromide, ketene, etc., to obtain 2-acetylfluorene, hydrogenating the latter to form 2-fluorenyl-methylcarbinol, and dehydrating the 2-fluorenyl-methylcarbinol to obtain 2-vinylfluorene.

Fluorene, also known as diphenylenemethane, readily undergoes a Friedel-Crafts reaction with

2 acetic anhydride, acetyl chloride and other acetylating agents in the presence of a Friedel-Crafts catalyst, e. g., aluminum chloride, aluminum bromide, ferric chloride, zinc chloride, boron fluoride, hydrogen fluoride, sulfuric acid, etc. The chief product of the acetylation, as the reaction is generally carried out, is 2-acetylfluorene. However, by varying the reaction conditions, e. g., temperature, solvent, catalyst, concentration, etc., mono-substitution may be obtained in other positions in the fluorene nucleus, e. g., in the 3 or 4 positions. Polyacetylfluorenes, more particularly diacetylfluorenes, may be readily obtained by subjecting any monoketone isomer to further acetylation, if necessary under more severe conditions. For instance, 2,7-diacetylfluorene may be obtained by acetylating 2-acetylfluorene. Monoketone isomers other than 2-acetylfluorene, e. g., 3-acetylfluorene, 4-acetylfluorene, etc., upon reduction to the corresponding carbinols and subsequent dehydration yield vinyl-substituted fluorene derivatives wherein the vinyl group is not in the 2-position but in the position originally occupied by the acetyl group. Thus from, for example, 3-acetylfluorene and 4-acetylfluorene the end products are, respectively, 3-vinylfluorene and 4-vinylfluorene. 2,7-divinylfluorene and other polyvinylfluorenes may be produced in a similar manner from the corresponding polyacetylfluorenes.

The acetylation reaction may be carried out in a solvent, e. g., carbon disulfide, nitrobenzene or other solvent which, under the conditions of reaction, is inert in a Friedel-Crafts reaction; or, the fluorene compound, more particularly unsubstituted fluorene, may be acetylated in the absence of a solvent to 2-acetylfluorene.

Taking 2-acetylfluorene as illustrative of the acetylated fluorene which is further processed in accordance with our invention, a typical procedure is as follows: The 2-acetylfluorene is reduced to 2-fluorenyl-methylcarbinol, for example by hydrogenating the compound in the presence of a hydrogenation catalyst, e. g., finely divided platinum, platinum oxide, palladium, copper chromite, etc. The catalytic reduction of 2-acetylfluorene to 2-fluorenyl-methylcarbinol, which also may be named 2-(α-hydroxethyl) fluorene, may be carried out at slightly above atmospheric pressure or at substantially higher pressure, for example at pressures of the order of 800 to 3000 pounds or more per square inch in accordance with the following equation:

III

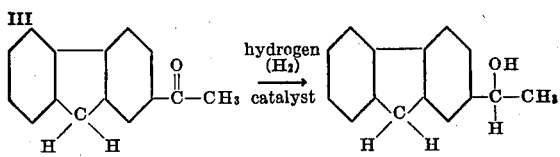

In hydrogenating the 2-acetylfluorene, care should be taken that the temperature does not rise too high, as otherwise the reduction may proceed beyond the carbinol stage and result in the formation of a high percentage of 2-ethylfluorene. Of course, if it is desired to prepare 2-ethylfluorene, which is a novel compound melting at 98° C., advantage may be taken of this discovery by hydrogenating the 2-acetylfluorene beyond the carbinol stage so as to obtain a high yield of 2-ethylfluorene.

The next step in the process is the conversion of the 2-fluorenyl-methylcarbinol to 2-vinylfluorene. This reaction is effected by dehydrating the 2-fluorenyl-methylcarbinol, e. g., with any of the usual chemical dehydrating agents such, for instance, as acid potassium sulfate, zinc chloride, phosphoric anhydride, etc. The direct vapor-phase catalytic dehydration is the preferred method. This consists in dehydrating the 2-fluorenyl-methylcarbinol in contact with activated alumina alone or with other metallic oxides, e. g., oxides of chromium, tungsten, molybdenum, manganese, etc., more particularly by passing the vapors of 2-fluorenyl-methylcarbinol over the activated alumina or other vapor-phase dehydration catalyst in a system which is maintained under reduced pressure, e. g., a pressure of 0.1 mm. to 15 mm. mercury. The crude product may be used as such, if desired, but preferably it is purified by suitable means, for example by recrystallizing from solution.

Another method of dehydration consists in treating the 2-fluorenyl-methylcarbinol with thionyl chloride to form 2-(α-chloroethyl) fluorene and treating the latter with an alkaline substance, for example pyridine or an alcoholic solution of an alkali-metal hydroxide (e. g., sodium hydroxide, potassium hydroxide, etc.), thereby to obtain 2-vinylfluorene admixed with a salt of the alkaline substance. The salt is removed by suitable means, for instance by washing a solution of the 2-vinylfluorene with water.

An alternative method for the preparation of a monovinylfluorene, e. g., 2-vinylfluorene, is by the catalytic dehydrogenation of a monoethylfluorene, e. g., 2-ethylfluorene, prepared either by the direct ethylation of fluorene or by the reduction of a monoacetylfluorene, e. g., 2-acetylfluorene, beyond the carbinol stage as pointed out above.

In order that those skilled in the art better may understand how the present invention may be carried into effect, the following examples are given by way of illustration and not by way of limitation. All parts and percentages are by weight.

EXAMPLE 1

Preparation of 2-acetylfluorene

Fluorene was dissolved in carbon disulfide in the ratio of one mole of fluorene per liter of solvent. To the resulting solution was added powdered, anhydrous aluminum chloride in the ratio of 1.5 moles aluminum chloride per mole of fluorene. Acetyl chloride in an amount corresponding to 1.2 moles was added to the reaction mass at such a rate as to cause gentle refluxing of the solution. After the main reaction had subsided, stirring and gentle refluxing were continued for a period of 2 hours. At the end of this time hydrolysis was carried out by the addition of water at such a rate as to remove gradually most of the carbon disulfide by distillation. The residue was diluted with trichloroethylene, and the diluted mass was washed first with water, then with a 5% aqueous solution of sodium carbonate, and again with water in order to remove all traces of aluminum chloride. After each washing the aluminum hydroxide that formed was removed by filtration, using a filter aid to facilitate filtration. It is important that the aluminum chloride be removed, since otherwise condensation with the splitting off of water and the partial or complete destruction of the 2-acetylfluorene may occur upon distillation of the reaction mass.

The solvent was removed from the washed mass by vacuum distillation (water pump). The solvent-free residue, containing 2-acetylfluorene and unreacted fluorene, was then distilled under high vacuum, yielding about 10% as a forerun of recovered fluorene, boiling at about 140° C. at 1 mm., or 165° C. at 10 mm. The 2-acetylfluorene was obtained, in a highly pure state and of light color, as a constant boiling fraction at 185° C. at 1 mm., or 210° C. at 10 mm. The product melted at 126°–129° C. and, after recrystallization from benzene, ligroin, absolute alcohol or other suitable solvent, melted sharply at 130°–131° C.

The following example illustrates another method of preparing 2-acetylfluorene.

EXAMPLE 2

One mole of fluorene was dissolved in 750 cc. nitrobenzene. To the resulting solution maintained at a temperature below 20° C. was added 2.2 moles powdered, anhydrous aluminum chloride. It is necessary that the temperature be kept from rising appreciably by effective, external cooling, as otherwise condensation through the active —$CH_2$— group takes place with the spontaneous evolution of hydrogen chloride and the liberation of sufficient heat to boil the nitrobenzene. When acetic anhydride (1.2 moles) was added to the carefully cooled mixture, reaction took place smoothly. Hydrolysis was effected by slowly adding water, the temperature being maintained below 40° C. during this step.

The reaction mass was washed as described in Example 1 to remove the aluminum chloride. The nitrobenzene was separated by distillation, using either steam distillation or distillation at reduced pressure, for example at 14 mm. pressure, at which point the nitrobenzene boiled at 97° C. The distillation was continued under reduced pressure as in Example 1 to obtain 2-acetylfluorene in a highly pure state and in a yield of about 70%. Only the mono-acetylated compound was obtained, and there was no evidence that the acetyl group had entered other than the 2-position of the fluorene.

EXAMPLE 3

Preparation of 2-fluorenyl-methylcarbinol

One hundred (100) grams of 2-acetylfluorene, 100 cc. of absolute ethanol and 6 grams of a hydrogenation catalyst, specifically finely divided copper chromite, were placed in a bomb having a total volume of 480 cc., and the 2-acetylfluorene therein subjected to hydrogenation. At a temperature of 130° C. it was found that the hydrogen pressure dropped from 1850 to 1070 pounds per square inch in about a half hour. This quantity of hydrogen is very close to the one mole theoretically required to reduce 2-acetylfluorene to 2-fluorenyl-methylcarbinol. The reaction product was separated from the ethanol and catalyst. It gave a negative ketone test with 2,4-dinitrophenylhydrazine test reagent, gave a positive Zerewitinoff test, showed approximately 98% active hydrogen, and was readily recrystallized from a mixture of petroleum ether (boiling range 30°–70° C.) and benzene to yield 2-fluorenyl-methylcarbinol as a sparkling white, crystalline material, melting sharply at 140°–141° C. The amount of 2-fluorenyl-methylcarbinol obtained by the hydrogenation of 2-acetylfluorene was almost quantitative. It is believed to be a new chemical compound, and is useful as an intermediate in the preparation of 2-vinylfluorene as shown by the following example.

EXAMPLE 4

*Preparation of 2-vinylfluorene*

Fifteen (15) pounds of pure 2-fluorenyl-methylcarbinol was placed in a 12-liter copper flask equipped with a 2-inch-diameter iron column. The column was packed for 24 inches with pellets of activated alumina, approximately $\frac{3}{32}$ of an inch in diameter, and was maintained at a temperature of 325° C. The flask was heated electrically, the temperature of the contents during the distillation being kept such that approximately 20 grams of monomer per minute distilled through the column. The crude product from the distillation melted at 114°–119° C.

A sample of crude 2-vinylfluorene, prepared as above described, was recrystallized from a mixture of petroleum ether and benzene. A white, crystalline solid, which melted at 126°–128° C., was obtained. It gave no Zerewitinoff test for active hydrogen. The carbon-hydrogen analysis showed the compound to correspond with the theoretical value for vinylfluorene:

Calculated for $C_{15}H_{12}$: C, 93.75%; H, 6.25%. Found: C, 93.63%; H, 6.41%.

The following example illustrates another method of dehydrating 2-fluorenyl-methylcarbinol to yield 2-vinylfluorene.

EXAMPLE 5

Fifty (50) grams of 2-fluorenyl-methylcarbinol was mixed with 20 grams of acid potassium sulfate. When distilled under a reduced pressure of 0.2 mm. mercury, the water split off at a bath temperature of 180° C. and a vaporization temperature of about 140° C. to yield monomeric 2-vinylfluorene. The melting points of the crude product and of the material recrystallized from a petroleum ether-benzene mixture were the same as the corresponding products of Example 4.

In general, 2-vinylfluorene may be inhibited by the same inhibitors that inhibit the polymerization of styrene, e. g., catechol, hydroquinone, etc. Such inhibitors may be washed out of the dissolved monomer with a dilute alkali solution, if desired; or, polymerization may be carried out in the presence of a small amount of inhibitor at an elevated temperature, with or without a polymerization catalyst.

Vinyl fluorenes, more particularly a monovinylfluorene such for instance as 2-vinylfluorene, are especially suitable for use in the preparation of polymers and copolymers that are useful in various industrial applications, for example in the plastics and coating arts and as dielectric materials in the electrical art. Thus, 2-vinylfluorene, for example, may be employed in producing polymers and copolymers as described and claimed in our copending application Serial No. 613,209, filed concurrently herewith and assigned to the same assignee as the present invention. Vinylfluorenes, e. g., 2-vinylfluorene, also may be used as starting materials in the preparation of other organic compounds.

What we claim as new and desire to secure by Letters Patent of the United States is:

1. A monovinylfluorene.
2. 2-vinylfluorene.
3. The method of preparing a monovinylfluorene which comprises reducing an acetylfluorene to a fluorenyl-methylcarbinol by reacting said acetylfluorene with hydrogen in the presence of a hydrogenation catalyst at pressures of from approximately 900 pounds per square inch to approximately 3000 pounds per square inch and at a temperature of approximately 130° C., and dehydrating the resulting fluorenyl-methylcarbinol by causing the vapors thereof to contact activated alumina thereby to obtain monovinylfluorene.
4. The method of preparing 2-vinylfluorene which comprises reacting 2-acetylfluorene with hydrogen in the presence of ethanol and a hydrogenation catalyst at elevated pressure and at a temperature of about 130° C., to form 2-fluorenyl-methylcarbinol, and dehydrating the 2-fluorenyl-methylcarbinol by causing the vapors thereof to contact activated alumina thereby to obtain 2-vinylfluorene.
5. The method of preparing 2-vinylfluorene which comprises acetylating fluorene to obtain 2-acetylfluorene, hydrogenating the latter to form 2-fluorenyl-methylcarbinol by reacting the 2-acetylfluorene with hydrogen in the presence of a hydrogenation catalyst at pressures of from approximately 900 pounds per square inch to approximately 3000 pounds per square inch and at a temperature of about 130° C., and dehydrating the 2-fluorenyl-methylcarbinol by causing the vapors thereof to contact activated alumina thereby to obtain 2-vinylfluorene.
6. The method of preparing 2-vinylfluorene which comprises acetylating fluorene by effecting reaction between fluorene and acetic anhydride in the presence of anhydrous aluminum chloride as a catalyst thereby forming 2-acetylfluorene, hydrogenating the latter to form 2-fluorenyl-methylcarbinol by reacting the 2-acetylfluorene with hydrogen in the presence of a hydrogenation catalyst and ethanol, at pressures of from approximately 1000 pounds per square inch to approximately 1800 pounds per square inch and at a temperature of about 130° C., and dehydrating the 2-fluorenyl-methylcarbinol by causing the vapors thereof to contact activated alumina thereby to obtain 2-vinylfluorene.

ROYAL K. ABBOTT, JR.
EDWARD A. KERN.

REFERENCES CITED

The following references are of record in the file of this patent:

UNITED STATES PATENTS

| Number | Name | Date |
|---|---|---|
| 2,291,915 | Palmer et al. (A) | Aug. 4, 1942 |
| 2,310,762 | Daumiller et al. | Feb. 9, 1943 |
| 2,345,625 | Palmer et al. (B) | Apr. 4, 1944 |
| 2,390,368 | Hochwalt | Dec. 4, 1945 |